US006985966B1

(12) United States Patent
Gupta et al.

(10) Patent No.: US 6,985,966 B1
(45) Date of Patent: Jan. 10, 2006

(54) RESYNCHRONIZING GLOBALLY UNSYNCHRONIZED MULTIMEDIA STREAMS

(75) Inventors: Anoop Gupta, Woodinville, WA (US); Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/538,611

(22) Filed: Mar. 29, 2000

(51) Int. Cl.
*G06F 15/16* (2006.01)
*G11B 27/00* (2006.01)

(52) U.S. Cl. ...................... 709/248; 709/231; 709/232; 709/217; 709/233; 709/234; 709/204; 715/725; 715/756

(58) Field of Classification Search ........ 709/231–234, 709/217, 248, 204; 345/725, 704, 748, 753, 345/756, 730
See application file for complete search history.

(56) References Cited

U.S. PATENT DOCUMENTS 4,931,950 A 6/1990 Isle et al. .................. 364/513
5,050,161 A 9/1991 Golestani .................... 370/60
5,119,474 A 6/1992 Beitel et al. ............... 395/154
5,274,758 A 12/1993 Beitel et al. ............... 395/154
5,309,562 A 5/1994 Li ............................ 395/200
5,313,454 A 5/1994 Bustini et al. ............... 370/13
5,341,474 A 8/1994 Gelman et al. ............. 395/200
5,414,455 A 5/1995 Hooper et al. ................. 348/7
5,434,848 A 7/1995 Chimento, Jr. et al. ....... 370/17
5,455,910 A 10/1995 Johnson et al. ............. 395/650
5,481,542 A 1/1996 Logston et al. ............ 370/94.2
5,490,252 A 2/1996 Macera et al. ......... 395/200.01
5,504,744 A 4/1996 Adams et al. ............. 370/60.1
5,519,701 A 5/1996 Colmant et al. ........... 370/60.1
5,521,630 A 5/1996 Chen et al. .................... 348/7
5,533,021 A 7/1996 Branstad et al. ........... 370/60.1
5,537,408 A 7/1996 Branstad et al. .............. 370/79
5,541,955 A 7/1996 Jacobsmeyer ............... 375/222
5,559,942 A 9/1996 Gough et al. ............... 395/155
5,566,175 A 10/1996 Davis .......................... 370/86
5,574,724 A 11/1996 Bales et al. ................ 370/68.1
5,614,940 A 3/1997 Cobbley et al. ............... 348/7
5,617,423 A 4/1997 Li et al. ..................... 370/426
5,623,690 A 4/1997 Palmer et al. .............. 395/806
5,625,405 A 4/1997 DuLac et al. .................. 348/7
5,640,320 A 6/1997 Jackson et al. ............. 364/192
5,664,227 A 9/1997 Mauldin et al. ............ 395/778
5,692,213 A * 11/1997 Goldberg et al. ........ 715/500.1
5,717,691 A 2/1998 Dighe ........................ 370/401
5,717,869 A 2/1998 Moran et al. ............... 395/339
5,719,786 A 2/1998 Nelson et al. .............. 364/514

(Continued)

FOREIGN PATENT DOCUMENTS

EP 0605115 7/1994

(Continued)

OTHER PUBLICATIONS

Hurst et al, "A synchronization model for recorded presentations and its relevance for information retrieval", Oct. 1999, ACM Multimedia, pp. 333-342.*

(Continued)

*Primary Examiner*—Ario Etienne
*Assistant Examiner*—Gregory G. Todd
(74) *Attorney, Agent, or Firm*—Perkins Coie LLP

(57) ABSTRACT

Media streams are provided from a server computer to client computers in a network system. The media streams are monitored and the streams becoming globally unsynchronized is detected. When the streams become unsynchronized, action is taken to resynchronize the streams, such as by altering the presentation timeline of at least one of the media streams.

26 Claims, 6 Drawing Sheets

Monitor Global Synchronization — 132
Out of Global Synchronization Beyond Threshold? — 134
No
Yes
Determine Effective Time Modification Factor — 136
Modify Presentation Timeline According to Time Modification Factor — 138
Monitor Global Synchronization — 140
Back in Global Synchronization? — 142
No
Yes
Determine New Time Modification Factor — 144
Modify Presentation Timeline According to New Modification Factor — 146

U.S. PATENT DOCUMENTS

| | | | | |
|---|---|---|---|---|
| 5,721,829 | A | 2/1998 | Dunn et al. | 395/200.49 |
| 5,742,347 | A | 4/1998 | Kandlur et al. | 348/426 |
| 5,768,533 | A | 6/1998 | Ran | 395/200.77 |
| 5,786,814 | A | 7/1998 | Moran et al. | 345/328 |
| 5,794,210 | A | 8/1998 | Goldhaber et al. | 705/14 |
| 5,794,249 | A | 8/1998 | Orsolini et al. | 707/104 |
| 5,799,292 | A | 8/1998 | Hekmatpour | 706/11 |
| 5,801,685 | A | 9/1998 | Miller et al. | 345/302 |
| 5,808,662 | A * | 9/1998 | Kinney et al. | 348/14.1 |
| 5,818,510 | A | 10/1998 | Cobbley et al. | 348/7 |
| 5,822,537 | A | 10/1998 | Katseff et al. | 395/200.61 |
| 5,828,848 | A | 10/1998 | MacCormack et al. | 395/200.77 |
| 5,828,994 | A * | 10/1998 | Covell et al. | 704/211 |
| 5,835,495 | A | 11/1998 | Ferriere | 370/465 |
| 5,835,667 | A | 11/1998 | Wactlar et al. | 386/96 |
| 5,838,906 | A | 11/1998 | Doyle et al. | 395/200.32 |
| 5,859,641 | A | 1/1999 | Cave | 345/348 |
| 5,864,682 | A | 1/1999 | Porter et al. | 395/200.61 |
| 5,870,755 | A | 2/1999 | Stevens et al. | 707/104 |
| 5,873,735 | A | 2/1999 | Yamada et al. | 434/316 |
| 5,892,506 | A | 4/1999 | Hermanson | 345/302 |
| 5,903,673 | A | 5/1999 | Wang et al. | 382/236 |
| 5,918,002 | A | 6/1999 | Klemets et al. | 395/182.16 |
| 5,930,787 | A | 7/1999 | Minakuchi et al. | 707/4 |
| 5,953,506 | A | 9/1999 | Kalra et al. | 395/200.61 |
| 5,956,716 | A | 9/1999 | Kenner et al. | 707/10 |
| 5,995,941 | A | 11/1999 | Maquire et al. | 705/10 |
| 5,999,979 | A | 12/1999 | Vellanki et al. | 709/232 |
| 6,006,241 | A | 12/1999 | Purnaveja et al. | 707/512 |
| 6,009,457 | A * | 12/1999 | Moller | 709/203 |
| 6,014,706 | A | 1/2000 | Cannon et al. | 709/231 |
| 6,023,731 | A | 2/2000 | Chawla | 709/231 |
| 6,032,130 | A | 2/2000 | Alloul et al. | 705/27 |
| 6,035,341 | A | 3/2000 | Nunally et al. | 709/253 |
| 6,041,345 | A | 3/2000 | Levi et al. | 709/217 |
| 6,049,823 | A | 4/2000 | Hwang | 709/218 |
| 6,064,794 | A | 5/2000 | McLaren et al. | 386/68 |
| 6,108,687 | A * | 8/2000 | Craig | 709/203 |
| 6,118,450 | A | 9/2000 | Proehl et al. | 345/349 |
| 6,118,817 | A | 9/2000 | Wang | 375/240 |
| 6,122,668 | A * | 9/2000 | Teng et al. | 709/231 |
| 6,128,653 | A | 10/2000 | Del Val et al. | 709/219 |
| 6,133,920 | A | 10/2000 | DeCarmo et al. | 345/354 |
| 6,144,375 | A | 11/2000 | Jain et al. | 345/302 |
| 6,148,304 | A | 11/2000 | De Vries et al. | 707/104 |
| 6,154,771 | A | 11/2000 | Rangan et al. | 709/217 |
| 6,161,137 | A * | 12/2000 | Ogdon et al. | 709/224 |
| 6,166,314 | A | 12/2000 | Weinstock et al. | 84/483.1 |
| 6,173,317 | B1 | 1/2001 | Chaddha et al. | 709/219 |
| 6,204,840 | B1 | 3/2001 | Petelycky et al. | 345/302 |
| 6,215,910 | B1 | 4/2001 | Chaddha | 382/253 |
| 6,230,172 | B1 | 5/2001 | Purnaveja et al. | 707/512 |
| 6,233,389 | B1 | 5/2001 | Barton et al. | 386/46 |
| 6,279,029 | B1 * | 8/2001 | Sampat et al. | 709/203 |
| 6,295,551 | B1 * | 9/2001 | Roberts et al. | 709/205 |
| 6,321,252 | B1 * | 11/2001 | Bhola et al. | 709/204 |
| 6,370,688 | B1 * | 4/2002 | Hejna, Jr. | 725/101 |
| 6,377,972 | B1 * | 4/2002 | Guo et al. | 709/201 |
| 6,397,230 | B1 * | 5/2002 | Carmel et al. | 709/231 |
| 6,415,326 | B1 * | 7/2002 | Gupta et al. | 709/231 |
| 6,480,902 | B1 * | 11/2002 | Yuang et al. | 709/248 |
| 6,598,228 | B2 * | 7/2003 | Hejna, Jr. | 725/91 |
| 6,622,171 | B2 * | 9/2003 | Gupta et al. | 709/231 |
| 6,625,656 | B2 * | 9/2003 | Goldhor et al. | 709/231 |
| 6,704,813 | B2 * | 3/2004 | Smirnov et al. | 710/52 |
| 6,728,753 | B1 * | 4/2004 | Parasnis et al. | 709/203 |
| 6,802,019 | B1 * | 10/2004 | Lauder | 713/400 |
| 2002/0013949 | A1 * | 1/2002 | Hejna, Jr. | 725/100 |
| 2002/0065926 | A1 * | 5/2002 | Hackney et al | 709/231 |

FOREIGN PATENT DOCUMENTS

| | | |
|---|---|---|
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 10/1997 |
| WO | WO 94/0194 | 1/1994 |
| WO | WO 98/37698 | 8/1998 |

OTHER PUBLICATIONS

Chen et al, “An RTP-based synchronized hypermedia live lecture system for distance education”, Oct. 1999, ACM Multimedia, pp. 91-99.*

Arons, Barry, “ SpeechSkimmer: A System for Interactively Skimming Recorded Speech”, ACM Transactions on Computer-Human, Vol. 4, No. 1, pp. 3-38.

Internet Reference “An Annotated Bibliography of Interactive Speech User Interfaces by Barry Arons ” HTTP:/barons.www.media.mit.edu/people/barons/AronsAnnotated Bibliography.html, Date unknown.

“GSM Full Rate Speech Transcoding,” ETSI/PT 12, Feb. 1992, pp. 1-93.

“Speech Codec for the European Mobile Radio System,” P. Vary et al., 1988, pp. 227-230.

Informedia — Internet References, http://www.informedia.cs.cmu.edu, date unknown.

H.J. Chen et al., “A Scalable Video-on-Demand Service for the Provision of VCR-Like Functions,” IEEE, May 15, 1995, pp. 65-72.

Lynda Hardman et al., “Multimedia authoring paradigms,” *Authoring and Application of Hypermedia-Based User-Interfaces, IEE Colloquium,* The Institution of Electrical Engineers 1995, pp 8/1-8/3.

John David N. Dionisio and Alfonso F. Cardenas, “A Unified Data Model for Representing Multimedia, Timeline, and Simulation Data,” *IEEE Transactions on Knowledge and Data Engineering*, vol. 10, No. 5, Sep./Oct. 1998, pp. 746-767.

Microsoft Corporation and RealNeworks, Inc., Advanced Streaming Format (ASF) Specification, Feb. 26, 1998, Public Specification Version 1.0, 55 pages.

* cited by examiner

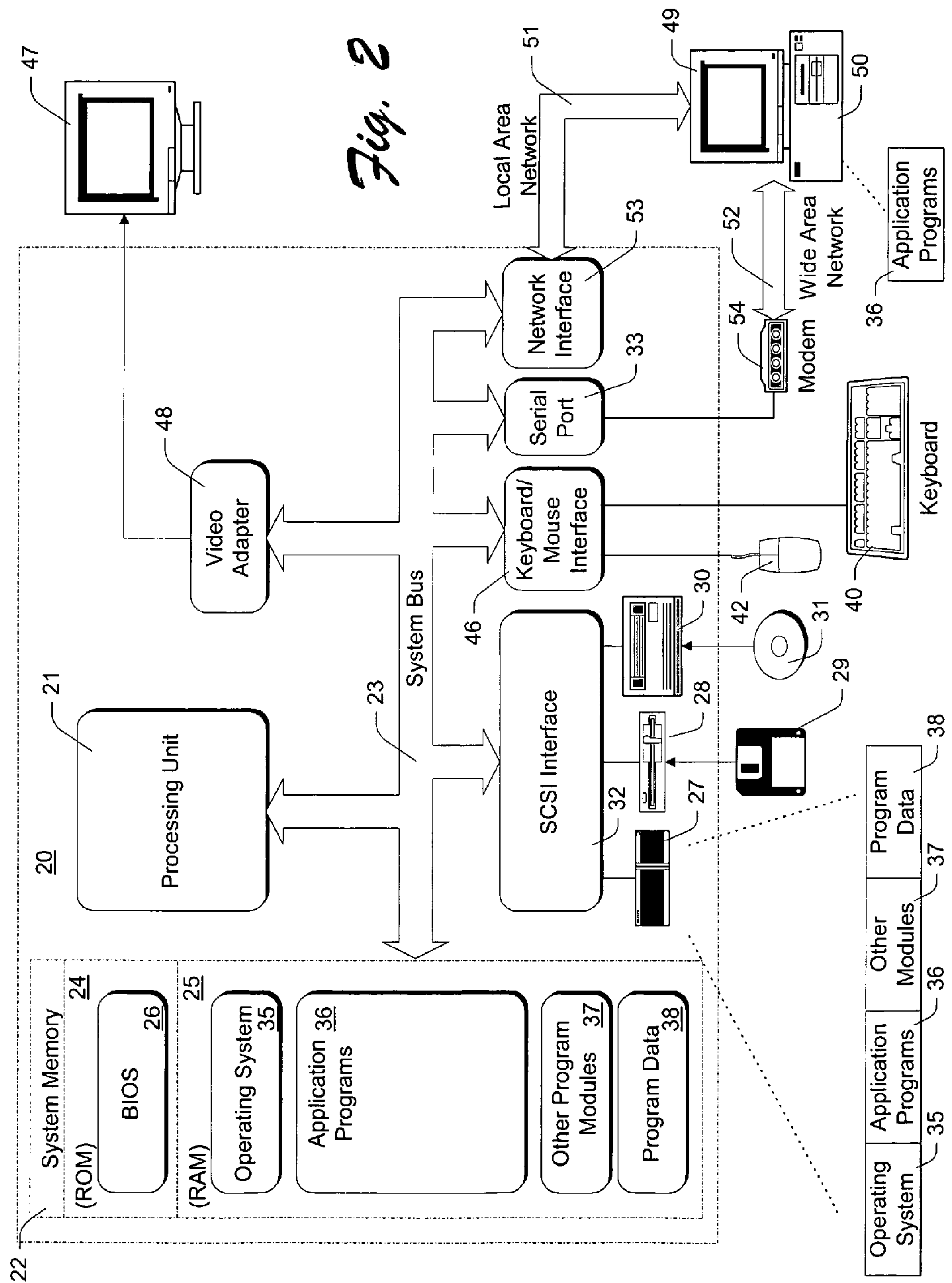
Fig. 2
20
22
System Memory
24
(ROM)
BIOS
26
25
(RAM)
Operating System 35
Application 36
Programs
Other Program Modules 37
Program Data 38
Processing Unit
21
23
System Bus
Video Adapter
48
47
SCSI Interface
32
Keyboard/ Mouse Interface
46
Serial Port
33
Network Interface
53
Local Area Network
51
49
50
Wide Area Network
52
Modem
54
Application Programs
36
Keyboard
40
42
27
28
29
30
31
Operating System
35
Application Programs
36
Other Modules
37
Program Data
38

RESYNCHRONIZING GLOBALLY UNSYNCHRONIZED MULTIMEDIA STREAMS

TECHNICAL FIELD

This invention relates to networked client/server systems and to methods of streaming and rendering multimedia content in such systems. More particularly, the invention relates to systems and methods of resynchronizing globally unsynchronized media streams.

BACKGROUND OF THE INVENTION

Multimedia streaming—the continuous delivery of synchronized media data like video, audio, text, and animation—is a critical link in the digital multimedia revolution. Today, streamed media is primarily about video and audio, but a richer, broader digital media era is emerging with a profound and growing impact on the Internet and digital broadcasting.

Locally synchronized media (or just "synchronized media") means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

The same data can be simultaneously streamed to multiple client computers. In some situations, it is very important that this data be rendered by each of the multiple client computers at as close to the same time as possible (referred to as the data streams being "globally synchronized"). For example, live financial broadcasts (e.g., stock quotes or other reports) should be made available to all recipients at as close to the same time as possible. If one computer is rendering the streamed data before another, each of the data streams being streamed to the two computers can be referred to as being "out of global synchronization" or "globally unsynchronized".

Rendering of data streams can become globally unsynchronized for a variety of different reasons. Bugs or other problems may exist in certain rendering devices (e.g., audio or video cards and/or their corresponding drivers) that cause the data on one computer to be rendered either slower or faster than expected. An example is clock-rate differences in the audio cards of rendering computers. This results in the data being rendered slower on one computer than on another, and the streams becoming more and more out of synchronization as rendering continues. Additionally, many modern computer systems are designed for the CPU to execute multiple different programs or processes concurrently (e.g., multi-tasking). In such a system, the CPU may spend a significant amount of time executing another process at the computer, causing the execution of the instructions for rendering the data stream at that computer to lag behind the execution of the instructions for rendering the data stream at another computer.

The invention described below addresses these disadvantages of data streaming, providing a way to resynchronize globally unsynchronized streams.

SUMMARY OF THE INVENTION

In a networked client/server system, the invention detects when media being streamed from a server(s) to multiple clients becomes globally unsynchronized. The invention then provides for resynchronization of the globally unsynchronized streams.

According to one aspect of the invention, the invention uses timeline alteration to resynchronize a media stream from a server computer to a client computer in a network system. The invention monitors the media stream and detects when the stream has become globally unsynchronized with a corresponding media stream being streamed to another client computer(s). When the stream has become globally unsynchronized, the invention alters the presentation timeline for the stream so that it is resynchronized with the other stream(s).

According to another aspect of the invention, the invention monitors how much data (in terms of presentation time) is buffered at a client computer for a data stream. If greater than a threshold amount of data is buffered, then the stream is deemed to be globally unsynchronized with corresponding data streams to other client computers.

According to another aspect of the invention, the timeline alteration occurs at the client computer. In accordance with this aspect, the client computer alters the timeline of a media stream(s) as necessary (either compressing or expanding the timeline) to resynchronize the media streams.

According to another aspect of the invention, the timeline alteration occurs at the server computer. In accordance with this aspect, either the client computer or the server computer monitors the media streams to determine when the streams have become globally unsynchronized. Once the streams are globally unsynchronized, the server computer selects a different one of multiple media streams corresponding to the media content being streamed to one of the client computers. This different media stream has a different timeline (either compressed or expanded) than the media stream that was previously being streamed to that client computer. This new media stream is then streamed to the client computer by the server computer in order to resynchronize the media streams.

Additionally, the timeline alteration and/or the new stream selection can be performed seamlessly, resulting in a much improved user experience—there are no perceived pauses or discontinuities of the multimedia streams.

BRIEF DESCRIPTION OF THE DRAWINGS

FIG. 2 is a block diagram of a networked computer that can be used to implement either a server or a client in accordance with one embodiment of the invention.

DETAILED DESCRIPTION

General Network Structure

Figure 1:
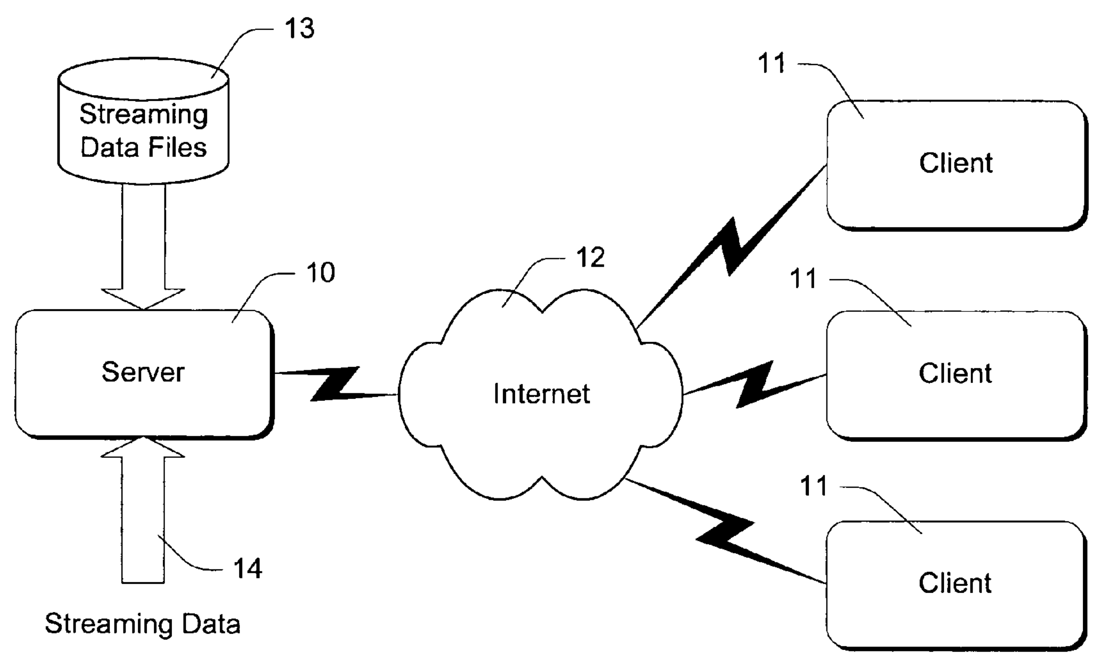
FIG. 1 is a block diagram of a networked client/server system in accordance with one embodiment of the invention.

FIG. 1 shows a client/server network system and environment in accordance with one embodiment of the invention. Generally, the system includes a network server computer 10 and a plurality of network client computers 11. The computers communicate with each other over a data communications network. The communications network in FIG. 1 comprises a public network 12 such as the Internet. The data communications network might also include local-area networks and private wide-area networks.

Server computer 10 has access to streaming media content in the form of different composite media streams. Some composite media streams might be stored as files in a database or other file storage system 13. Other composite media streams 14 might be supplied to the server on a "live" basis from other data source components through dedicated communications channels or through the Internet itself.

The composite media streams can be provided to the network client computers 11 from the server computer 10. Alternatively, the network system may include multiple server computers 10, with different composite media streams being available from different server computers 10. Additionally, if the network system includes multiple server computers 10, different media streams of a composite media stream may be stored at different server computers 10.

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. The "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

FIG. 2 shows a general example of a computer 20 that can be used as a network node or host in accordance with the invention. Computer 20 is shown as an example of a computer that can perform the functions of either server computer 10 or a client computer 11.

Computer 20 includes one or more processors or processing units 21, a system memory 22, and a system bus 23 that couples various system components including the system memory 22 to processors 21.

The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within computer 20, such as during start-up, is stored in ROM 24. Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by an SCSI interface 32 or some other appropriate interface. The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to the system bus. A monitor 47 or other type of display device is also connected to the system bus 23 via an interface, such as a video adapter 48. In addition to the monitor, personal computers typically include other peripheral output devices (not shown) such as speakers and printers.

Computer 20 operates in a networked environment using logical connections to one or more remote computers, such as a remote computer 49. The remote computer 49 may be another personal computer, a server, a router, a network PC, a peer device or other common network node, and typically includes many or all of the elements described above relative to computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets, and the Internet. In the described embodiment of the invention, remote computer 49 executes an Internet Web browser program such as the "Internet Explorer" Web browser manufactured and distributed by Microsoft Corporation of Redmond, Wash.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. The modem 54, which may be internal or external, is connected to the system bus 23 via a serial port interface 33. In a networked environment, program modules depicted relative to the personal computer 20, or portions thereof, may be stored in the remote memory storage device. It will be appreciated that the network connections shown are exemplary and other means of establishing a communications link between the computers may be used.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Time-Scale Modification

As shown in FIG. 1, a network system in accordance with the invention includes a network server 10 from which one or more composite media streams are available. In the described embodiment of the invention, the media streams are stored as files on some type of data storage device accessible by the server.

The system also includes network clients 11. Generally, the network clients are responsive to user input to select or request identified composite media streams. In response to a request for a composite media stream, server 10 streams the requested composite media stream to the requesting network client in accordance with some known format such as ASF. The client renders the data streams to produce the multimedia content.

Additionally, a network client may also accept a speed designation or playback speed from a human user. The speed designation might be a speed factor relative to the original or default playback speed of the selected multimedia stream. For example, a speed factor of 1.2 indicates that the composite media stream is to be rendered at 1.2 times its original or default speed, thereby achieving time compression. A speed factor of 0.8 indicates that the composite media stream is to be rendered at 0.8 times its original or default speed, thereby achieving time expansion.

In response to the speed or playback designation from the user, the client requests a composite media stream from the server, indicating the desired type, level, or degree of timeline alteration. A plurality of composite streams are available at the server, corresponding to different possible timeline alterations. In response to the request from the client, the server begins streaming a composite stream that has already had its timeline altered in accordance with the speed designation. Alternatively, the server may not include multiple composite streams for the different possible timeline alterations, in which case the client performs the timeline alteration (although it should be noted that the server would then need to speed up or slow down as appropriate its delivery of the media stream to the client when the client alters the timeline).

With some types of media, such as video streams, timeline alteration involves either omitting selected frames or modifying the presentation times of the individual data units or video frames. In other cases, such as with audio streams, the time-modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. It improves on the sampling method by playing the standard sampled signal to one ear and the "discarded" material to the other ear. Intelligibility and compression increase under this dichotic presentation condition when compared with standard presentation techniques.

More information regarding audio time modification is given in an article that appeared in the March, 1997, issue of "ACM Transactions on Computer-Human Interaction" (Volume 4, Number 1, pages 3–38) (1997). For purposes of this disclosure, it can be assumed that audio time modification involves some combination of changing individual data stream samples, dropping certain samples, and adjusting presentation times of any samples that are actually rendered.

The methods mentioned above are considered "linear" because all portions of the speech signal are compressed or expanded uniformly. That is, timeline alteration is applied consistently in time.

In addition, or alternatively, the speed designation might indicate one of a plurality of different types or levels of non-linear timeline compression. As an example, such levels might include a type of non-linear timeline compression that removes audio pauses from a spoken presentation or periods of relative inactivity from a video presentation. Another level, perhaps referred to as "summary" compression, might retain only short periods of a presentation that are marked by high energy levels in either audio or video portions of the content. With non-linear techniques some segments of an individual or composite stream might be more highly expanded or compressed (in time) than other segments. Furthermore, the respective individual streams of a composite stream might be expanded or compressed by different amounts relative to each other.

Client-Based Resynchronization

Figure 3:
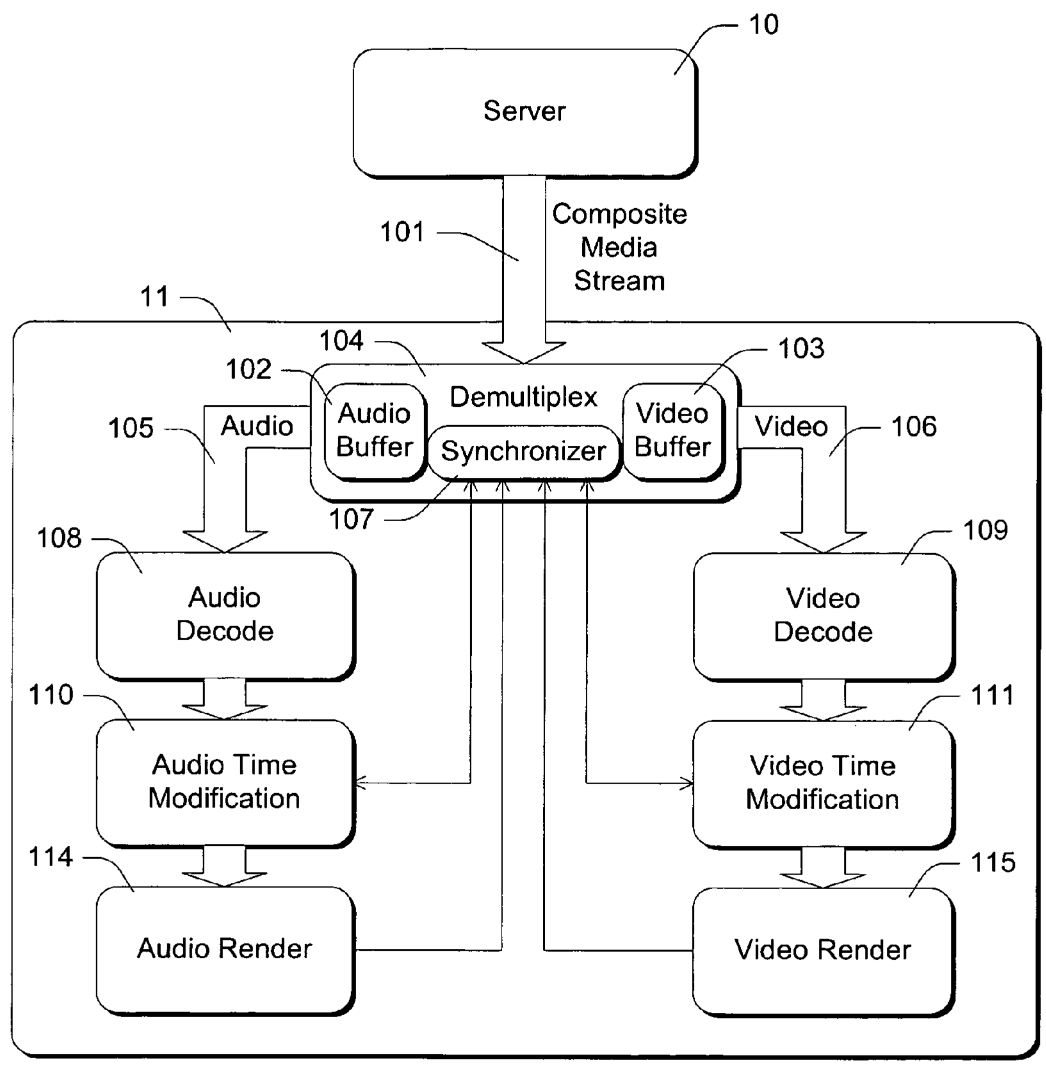
FIG. 3 is a block diagram illustrating one embodiment of the invention, in which resynchronization is performed by a client.

FIG. 3 illustrates an embodiment of the invention in which resynchronization is performed by network client 11. Network server 10 streams a composite media stream 101 to network client 11 (although not shown in FIG. 3, other communications also take place bi-directionally between server 10 and client 11, such as control-oriented communications). The composite media stream has a plurality of individual media streams as described above. For purposes of discussion, it is assumed in this example that the composite media stream has an audio stream and a video stream.

Each media stream has a timeline, and the timelines of the individual streams are synchronized with each other so that the streams can be rendered in combination to produce coordinated multimedia content at the network client 11. The original timelines correspond to the original recording or rendition of the multimedia material, so that rendering the streams according to their timelines results in presentation speeds that closely match the speed of the original event or performance. In the case of audio streams, the timelines preserve the original speed and pitch of the original audio content.

The client computer has a demultiplexer component 104 that receives the composite media stream and that separates out the individual media streams from the composite format in which the data is streamed (such as ASF). The separate media streams are temporarily buffered in buffers 102 and 103, from which an audio stream 105 and a video media stream 106 are provided, respectively. The individual media streams are sent to and received by respective decoders 108 and 109 that perform in accordance with the particular data format being employed. For example, the decoders might perform data decompression.

The decoded data streams are then sent to and received by time modification components: an audio timeline modification component 110 and a video timeline modification component 111. These components receive input from a human operator in the form of a speed designation as described above. The timeline modification components change the timelines of the received media streams in accordance with the user speed designation to achieve either time compression or time expansion. With some types of media, such as video streams, this involves either omitting selected frames or modifying the presentation times of the individual data units or video frames. In other cases, such as with audio streams, some type of audio processing technique as the SOLA technique described above is used to time-compress or time-expand audio streams, while maintaining the original pitch of the audio and to also retain the intelligibility of the audio.

The timeline modification components 110 and 111 produce individual media streams that are provided to and received by respective renderers 114 and 115. The rendering components render the streams in accordance with their modified timelines, as the streams continue to be streamed from the network server. In alternative embodiments of the invention, timeline modification components 110 and 111 might be eliminated and their functions performed by decoders 108 and 109.

The demultiplexer component 104 also has a synchronizer 107, coupled to the timeline modification components 110 and 111 and the renderers 114 and 115 as illustrated, that monitors the media streams to ensure that they remain synchronized with the corresponding streams being delivered to other client computers (that is, remain globally synchronized). When synchronizer 107 detects that a media stream(s) being rendered at client 11 is out of synchronization with a corresponding media stream(s) being rendered at another client computer, the time modification performed by the timeline modification component 110 or 111 corresponding to at least one of the streams is altered to resynchronize the stream(s) with its counterpart(s) being delivered to the other client computer.

Note that the speed designation, provided by the user and possibly modified by synchronizer 107, dictates the rate at which the network client consumes the composite data stream. Because of this, the client communicates the speed designation to the network server when requesting a particular composite media stream. The server responds by streaming the composite media stream at a rate that depends on or is proportional to the speed designation provided by the user as modified by synchronizer 107. For example, for a speed factor of 2.0, the client consumes data at twice the normal rate. Accordingly, the server streams the composite media stream at twice its normal rate to meet the demands of the client.

In the described embodiment, the user and the synchronizer 107 are allowed to change the speed designation during rendering of the composite media stream. In some cases, however, it may not be possible to change the playback speed without interrupting the playback momentarily. If this is the case, playback resumes as soon as possible, beginning at a point that shortly precedes the point at which playback was discontinued. Thus, there is some overlap in the presentation—when the presentation resumes, the overlap provides context for the new content that follows.

Figure 4:
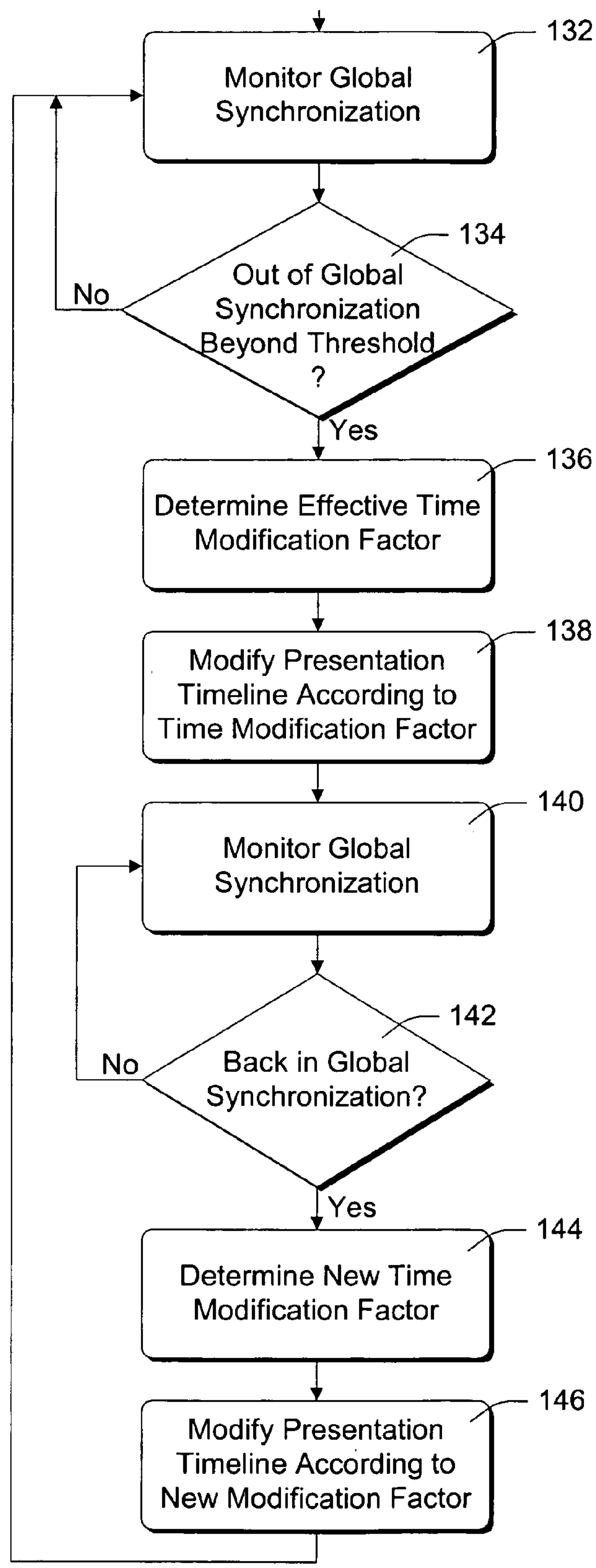
FIG. 4 illustrates methodological aspects of the invention according to an embodiment implemented in a client computer system.

FIG. 4 illustrates methodological aspects of the invention according to an embodiment implemented in a client computer system.

A step 132 comprises monitoring the global synchronization of the media streams. According to one implementation, this monitoring comprises the synchronizer 107 monitoring how much presentation time (e.g., in seconds or milliseconds) of data is buffered (e.g., in buffers 102 and 103) waiting to be decoded and rendered. Alternatively, the monitoring may comprise the synchronizer 107 monitoring the current presentation times of the devices rendering the media streams (e.g., renderers 114 and 115 of FIG. 3). These current presentation times are available from the renderers 114 and 115.

A step 134 comprises the synchronizer 107 checking whether the media streams are out of global synchronization with corresponding media streams being delivered to another client computer beyond a particular threshold value. According to one implementation, this checking comprises determining the time required to present all of the data that is stored in buffers 102 and 103 and checking whether the required time exceeds a threshold value (e.g., 5 seconds worth of data). The monitoring step 132 and checking step 134 are repeated until the media stream becomes globally unsynchronized beyond the threshold value. Alternatively, control information may be received from server 10 of FIG. 1 or some other computer notifying client 11 what the current presentation times of the devices rendering the media streams should be. Synchronizer 107 then determines whether the difference between the actual presentation times and what the presentation times should be exceeds the threshold value.

A step 136 comprises the synchronizer 107 determining an effective time modification factor. The time modification factor identifies the alteration that will be made to the timeline of a globally unsynchronized media stream to resynchronize the media stream. The time modification factor can be determined in any of a wide variety of manners. The time modification factor could be a specific value (e.g., 20 milliseconds per second), or a relative value (e.g., 10 percent). The actual value (whether specific or relative) can vary, balancing the intelligibility of the stream received by the user against the desire for quick resynchronization. It is to be appreciated that the time modification factor determined in step 136 can be a positive value (e.g., to speed up the presentation of the media stream) or a negative value (e.g., to slow down the presentation of the media stream).

A step 138 comprises altering the presentation timeline of one of the media streams according to the time modification factor determined in step 136. In the illustrated embodiment of FIG. 3, the synchronizer 107 modifies the time modification factor used by the respective one of time modification components 110 and 111 by adding the modification factor determined in step 136 to the speed factor currently being used for the media stream. Synchronizer 107 resynchronizes the media streams by using the time modification factor to slow down (or speed up) the rendering of the media streams by renderers 114 and 115.

A step 140 comprises monitoring the global synchronization of the media stream, while a step 142 comprises checking whether the media stream is back in global synchronization (that is, whether the media stream has been globally resynchronized). Given the modification of the presentation timeline in step 138, eventually the media stream should be globally resynchronized.

According to one implementation, global resynchronization is determined according to the same threshold value used to determine becoming globally unsynchronized in step 134. For example, if the presentation times no longer differ by greater than the threshold value used in step 134 (or the presentation time of buffered data no longer exceeds the threshold value), then the data is resynchronized. According to an alternate embodiment, this "resynchronized threshold value" in step 142 is different than the "unsynchronized threshold value" in step 134. By way of example, the threshold value in step 134 may be 5 seconds, whereas the resynchronization threshold value may be 3 seconds. By making these resynchronized and unsynchronized threshold values different, the system can avoid continually switching back and forth between being globally synchronized and globally unsynchronized.

A step 144 comprises determining a new time modification factor once the media stream is globally resynchronized. According to one implementation, this new time modification factor is the difference between the current timeline speed factor and the speed factor of the timeline prior to its alteration in step 138. Alternatively, the modification factor in step 144 may be different to try to correct the problem causing the stream to become globally unsynchronized. For example, if the modification factor in step 136 was +10 milliseconds per second, the modification factor in step 144 may be −8 milliseconds per second.

A step 146 comprises modifying the present timeline according to the new modification factor. The process then returns to step 132, to continue monitoring the global synchronization.

According to an alternate embodiment of the invention, steps 140 through 146 are optional and need not be included. In this embodiment, after the timeline is modified in step 138, the process returns to step 132 to continue monitoring the global synchronization.

Alternatively, other solutions which do not require timeline modification may also be used to resynchronize the media streams. According to one such alternative implementation, one of the streams can "jump ahead" to catch up to the other stream. For example, if synchronizer 107 of FIG. 3 detects that the media stream is being rendered ahead of a corresponding stream at other client systems (e.g., out of global synchronization beyond the threshold amount in step 134), then synchronizer 107 can have the stream "jump ahead" to a later presentation time. For example, portions of the data (e.g., two or three seconds worth of data) can be deleted from buffers 102 and 103. The amount of this "jump" can be a fixed amount (e.g., two or three seconds), or alternatively a variable amount (e.g., 40% of the data in the buffers 102 and 103). After such a jump, the process returns to step 132 to continue to monitor the global synchronization and determine whether the media streams are out of global synchronization.

According to another alternative implementation, one of the streams is stopped temporarily. For example, if synchronizer 107 detects that the media stream is being rendered behind a corresponding stream at other client systems (e.g., out of global synchronization beyond the threshold amount in step 134), then synchronizer 107 can temporarily pause the stream. For example, synchronizer 107 can communicate with buffers 102 and 103 to stop providing audio and video data to decoders 108 and 109 for an amount of time (e.g., two or three seconds). The duration of this pause caused by not providing data to decoders 108 and 109 can be a fixed amount (e.g., two or three seconds), or alternatively a variable amount (e.g., 30% of the time that would be required to render all of the data currently in buffers 102 and 103). After such a pause, the process returns to step 132 to continue to monitor the global synchronization and determine whether the media streams are out of global synchronization.

Server-Based Resynchronization

In various embodiments of the invention, the global resynchronizing of a media stream(s) can be performed in the client as described above, in the server, or in both the client and server. In the network environment, it is often desirable to avoid performing any significant timeline modification in the server. Otherwise, the server could quickly become overloaded with requests from multiple clients.

However, in some cases it may be desirable to store multiple versions of media streams at a server and to select particular versions of the media streams depending on the timeline requirements of the client (based both on requirements designated by the user and resynchronization requirements). One advantage of this method is that it can require comparatively less communications bandwidth between the server and client.

As a general example, a server might store a plurality of media streams that are live modifications of a "live" stream having timelines modified by different factors. When a client requests a composite media stream, the server selects the version of the media stream whose timeline most closely accords with the speed designation set by the user. If the timeline does not exactly match the speed designation, the client can perform further timeline modification.

Figure 5:
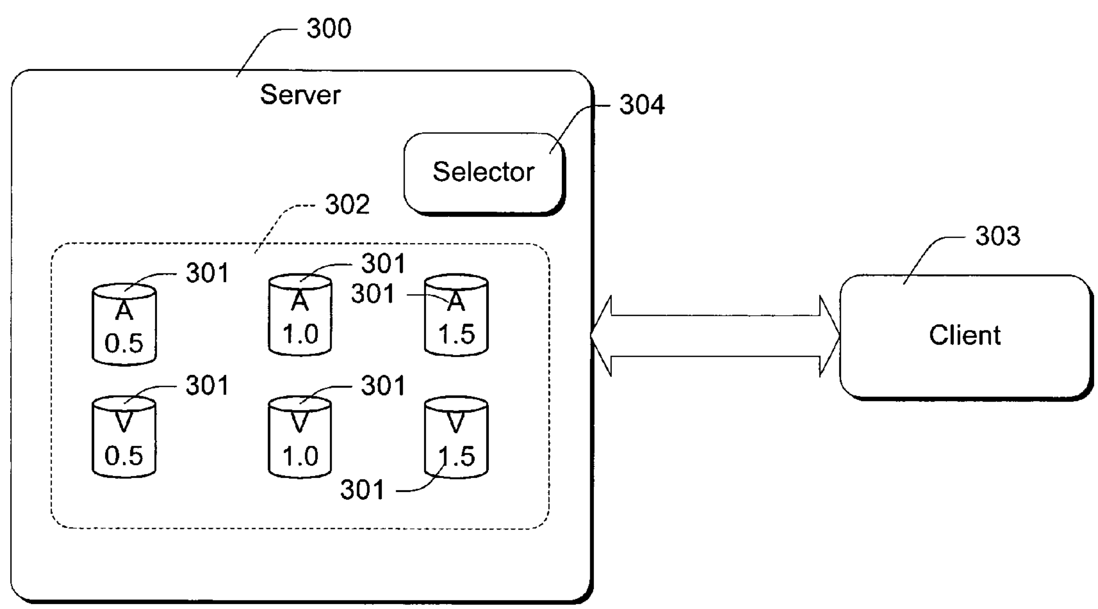
FIG. 5 is a block diagram illustrating one embodiment of the invention, in which resynchronization is performed by a server.

FIG. 5 illustrates a more specific example. In this embodiment, a server 300 stores multiple media streams 301 corresponding to specific multimedia content 302. The media streams are of different types, such as audio and video. In FIG. 5, audio streams are designated by the letter "A" and video streams are designated by the letter "V". Any combination of a single audio stream and a single video stream can be rendered to produce the multimedia content.

The various individual data streams have timelines that are modified by different degrees. The speed factors are indicated in FIG. 5. In this embodiment, the audio and corresponding video streams are organized as pairs, each pair forming a composite media stream having a timeline that has been modified by a factor of 0.5, 1.0, or 1.5.

When a client 303 requests multimedia content from server 300, the client identifies both the content and the speed factor. In response, a selector component 304 of the server selects the audio and video streams that have timelines most closely approximating the identified speed factor, and combines those individual media streams to form the composite media stream. The resulting composite media stream is then sent to the client. When the timeline is accelerated, this saves bandwidth in comparison to sending an unaltered composite media stream having a higher streaming rate to meet the accelerated consumption demands of the client.

When the user changes the playback speed or a media stream needs to be globally resynchronized, the client requests a new media stream that most closely corresponds to the requested or resynchronization speed. Playback is resumed in the new stream at the same point (relative to the subject content) at which it was discontinued in the old stream. Thus, the new stream is initiated at some intermediate point rather than at the beginning. When the streams are linearly altered, it is not difficult to determine the appropriate presentation time in the new stream. Specifically, the point in the new timeline equals oldtime(oldfactor/newfactor), where oldtime is the presentation time in the first media stream at which the speed change is to occur, oldfactor is the playback speed or factor of the old media stream, and newfactor is the playback speed or factor of the new media stream.

Figure 6:
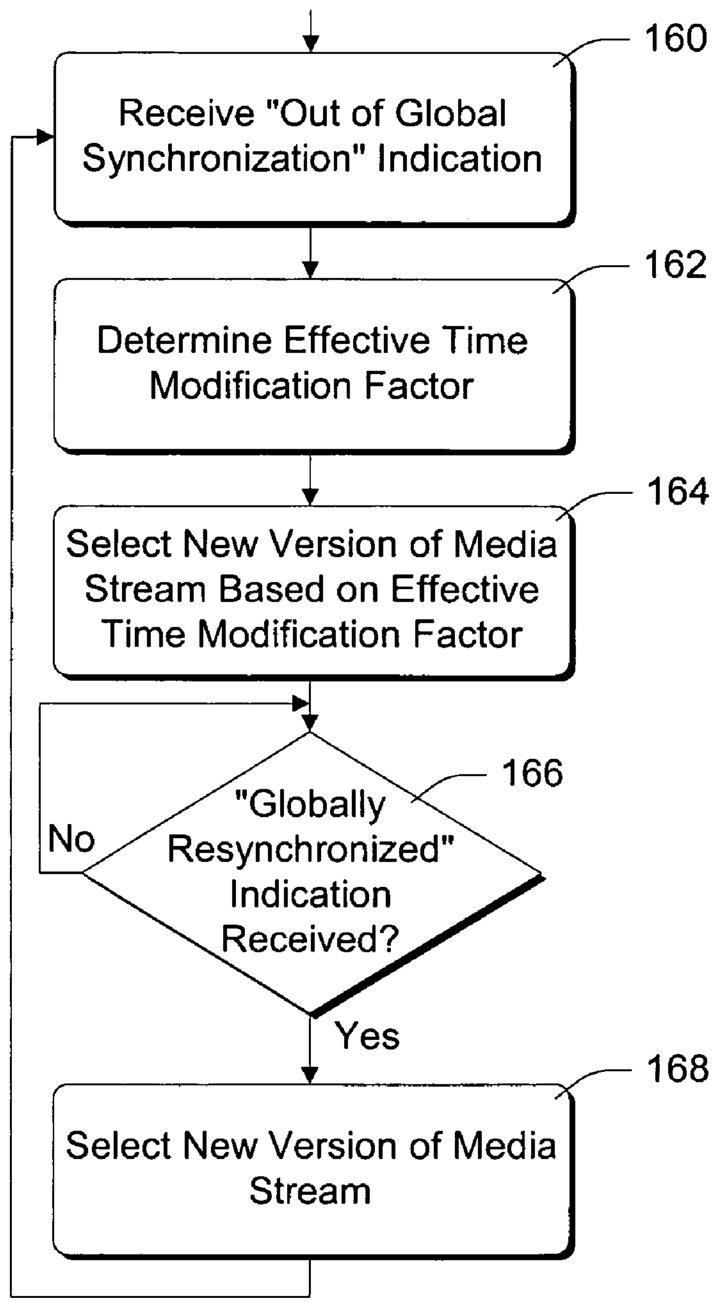
FIG. 6 illustrates methodological aspects of the invention according to an embodiment implemented in a server computer system.

FIG. 6 illustrates methodological aspects of the invention according to an embodiment implemented in a server computer system.

A step 160 comprises the server system receiving an "out of global synchronization" indication from a client system. In this embodiment, the client system monitors the global synchronization of the media streams and determines when the streams are globally unsynchronized, analogous to steps 132 and 134 of FIG. 4. When the stream becomes globally unsynchronized, an "out of global synchronization" indication (e.g., a message) is sent to the server system. Alternatively, synchronization information (e.g., the current presentation times of the media streams) could be provided to the server system and the server system could determine when the media stream becomes globally unsynchronized.

A step 162 comprises determining an effective time modification factor. This time modification factor is determined analogous to step 136 above.

A step 164 comprises selecting a new version of one of the media streams based on the effective time modification factor determined in step 162. The new version could be of either the slower or the faster (or both) stream, analogous to step 138 above. One of the multiple versions stored at the server is selected for presentation. According to one implementation, the effective time modification factor is compared to the time modification factors of each of the multiple streams stored at the server and the version of the media stream having the factor closest to the determined effective time modification factor is selected for delivery to the client system.

A step 166 comprises checking whether a "globally resynchronized" indication is received. The resynchronized indication (e.g., a message) is sent by the client system when the media stream has been globally resynchronized. Alternatively, synchronization information (e.g., the current presentation times of each of the media streams) could be provided to the server and the server could determine when the media stream has been globally resynchronized.

A step 168 comprises selecting a new version of the media stream to be presented to the client system. According to one implementation, the new version selected in step 168 is the same version as was being provided prior to the new selection in step 164.

The process then ends, until another "out of global synchronization" indication is received.

According to an alternate embodiment of the invention, steps 166 and 168 are optional and need not be included. In this embodiment, after the new version of the media stream is selected in step 164, the process ends, until another "out of global synchronization" indication is received.

Alternatively, other solutions which do not require timeline modification may also be used to resynchronize the media streams. For example, server 300 of FIG. 5 may "jump ahead" in a stream or pause a stream, analogous to the discussions above regarding client 11 of FIG. 3, to globally resynchronize the streams.

In the discussions above, regarding both client-based and server-based resynchronization, the invention is described as working with a composite media stream. It should be noted that alternate embodiments of the invention can be used with a single media stream being provided to a client rather than a composite of multiple media streams.

Also in the discussions above, regarding both client-based and server-based resynchronization, a single time modification factor to be used to resynchronize the globally unsynchronized media stream. Alternatively, multiple different time modifications factors may be used to resynchronize the stream, such as by starting with a more aggressive factor (e.g., a larger value) to more quickly resynchronize, and then changing to a less aggressive factor (e.g., a smaller value) as the stream gets closer to resynchronization.

Also in the discussions above, regarding both client-based and server-based resynchronization, timeline modification is used to alter the timeline of one of the media streams. Alternatively, multiple different media streams can be altered simultaneously. For example if a first media stream to a first client lags behind and becomes out of global synchronization with a second media stream to a second client, then timeline alteration could be used to both speed up the first media stream and slow down the second media stream.

CONCLUSION

The invention described above provides resynchronization of globally unsynchronized media streams. The described techniques monitor the synchronization of media streams being streamed to different computers and detect when the streams become globally unsynchronized, and advantageously resynchronizes the streams. In one implementation, the presentation timeline of at least one of the streams is then modified to either increase or decrease the speed of the rendering of the media stream, as appropriate. This timeline modification allows the stream to become resynchronized in a manner that maintains a high-quality user experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for use in a client computer, the method comprising:

receiving at a first client computer a media stream from a server computer in a network system, the media stream being simultaneously streamed to multiple client computers including the first client computer and a second client computer;

buffering at the first client computer media of the received media stream;

detecting at the first client computer when the media stream received from the server computer in the network system has become globally unsynchronized with the media stream being simultaneously streamed to the second client computer, the media stream received by the first client computer being globally unsynchronized with the media stream being streamed to the second client computer when the media in the buffer at the first client computer is greater than a first amount or is less than a second amount, and wherein the first client computer determines that it is globally unsynchronized independently of the media stream being streamed to the second client computer; and altering at the first client computer a presentation timeline of the media stream in order to resynchronize the media stream of the first client computer with the media stream of the second client computer.

2. A method as recited in claim 1, wherein the altering includes altering the media stream.

3. A method as recited in claim 1, wherein the altering comprises compressing a presentation timeline of the media stream.

4. A method as recited in claim 1, wherein the altering comprises increasing the speed at which the media stream is rendered.

5. A method as recited in claim 1, wherein the altering comprises omitting selected frames from the media stream.

6. A method as recited in claim 1, wherein the altering comprises using time-scale-modification to remove data from or add data to the media stream.

7. A method as recited in claim 1, wherein the altering comprises jumping ahead to a later presentation time.

8. A method as recited in claim 1, wherein the altering comprises pausing the presentation of the media stream.

9. A method as recited in claim 1, further comprising:

storing at least a portion of the media stream in a data buffer; and wherein the detecting comprises comparing the amount of data stored in the data buffer with a threshold.

10. A method as recited in claim 1, further comprising:

detecting when the media stream has been globally resynchronized; and altering the presentation of the media stream when the media stream has been globally resynchronized.

11. A method as recited in claim 10, wherein the altering of the presentation timeline of the media stream when the media stream has been globally resynchronized comprises altering the presentation timeline to be the same as it was when the media stream was globally unsynchronized.

12. A computer-readable memory which directs the client computer to perform the steps of the method as recited in claim 1.

13. An apparatus for use in a network system, the apparatus comprising:

a receiving component to receive at a first client computer a plurality of media streams from a server computer in the network system, the media streams being simultaneously streamed to multiple client computers including the first client computer and a second client computer;

buffers at the first client computer for storing media of the received media streams;

a synchronizing component, coupled to the buffers, to determine if the plurality of media streams at the first client computer have become globally unsynchronized with the media streams being simultaneously streamed to the second client computer, a media stream being globally unsynchronized when the media in a buffer at the first client computer is greater than a first amount or less than an second amount, and wherein the first client computer determines that it is globally unsynchronized independently of the media stream being streamed to the second client computer; and a timeline modification component, coupled to the synchronizing component, to alter the presentation timeline of at least one of the media stream of the first client computer if the media streams of the first client computer becomes globally unsynchronized with the media stream of the second client computer.

14. An apparatus as recited in claim 13, wherein the timeline modification component is to alter the timeline of the at least one media stream by compressing the timeline.

15. An apparatus as recited in claim 13, wherein the timeline modification component is to alter the timeline of the at least one media stream by omitting selected frames from the media stream.

16. An apparatus as recited in claim 13, wherein the timeline modification component is to alter the timeline of the at least one media stream by using time-scale-modification to remove data from or add data to the media stream.

17. A computer-readable storage medium containing a program for resynchronizing a media stream, the program having instructions that are executable by a network client to perform steps comprising:

receiving, from a server computer in the network, at a first network client, a composite media stream including a plurality of media streams, the plurality of media streams being simultaneously streamed to multiple network clients including the first network client and a second network client;

buffering, at the first network client, a media stream;

detecting, at the first network client, when the media streams being streamed to the first network client has become globally unsynchronized with the media stream being simultaneously streamed to the second network client, wherein the media stream received by the first network client is globally unsynchronized with the media stream received by the second network client when the media in the buffer at the first network client is greater than a first amount or is less than a second amount, and wherein the first network client determines that it is globally unsynchronized independently of the media stream being streamed to the second network client; and altering, at the network client, a timeline of the media stream of the first network client in order to resynchronize the media streams of the first network client and the second network client.

18. A computer-readable storage medium as recited in claim 17, wherein the detecting comprises comparing current presentation times of the plurality of media streams to one another, and wherein the altering comprises altering the media stream of the plurality of media streams having a presentation time that is lagging behind the presentation times of one or more of the other media streams.

19. A computer-readable storage medium as recited in claim 17, wherein the detecting comprises comparing current presentation times of the plurality of media streams to one another, and wherein the altering comprises altering the media stream of the plurality of media streams having a presentation time that is ahead of the presentation times of one or more of the other media streams.

20. A computer-readable storage medium as recited in claim 17, wherein the altering comprises altering each media stream of the plurality of media streams.

21. A computer-readable storage medium as recited in claim 17, wherein the altering comprises compressing the timeline of the at least one media stream.

22. A computer-readable storage medium as recited in claim 17, wherein the altering comprises increasing the speed at which the at least one media stream is rendered.

23. A computer-readable storage medium as recited in claim 17, wherein the altering comprises omitting selected frames from the at least one media stream.

24. A computer-readable storage medium as recited in claim 17, wherein the altering comprises using time-scale-modification to remove data from the media stream.

25. A computer-readable storage medium as recited in claim 17, the program having instructions that are executable by the network client to further perform steps comprising:

detecting when the media streams have been resynchronized; and altering the timeline of the at least one media stream when the media streams have been resynchronized.

26. A computer-readable storage medium as recited in claim 25, wherein the step of altering the timeline of the at least one media stream when the media streams have been resynchronized comprises altering the timeline to be the same as it was when the at least one media stream was globally unsynchronized.

* * * * *

UNITED STATES PATENT AND TRADEMARK OFFICE
CERTIFICATE OF CORRECTION

PATENT NO. : 6,985,966 B1
APPLICATION NO. : 09/538611
DATED : January 10, 2006
INVENTOR(S) : Anoop Gupta et al.

It is certified that error appears in the above-identified patent and that said Letters Patent is hereby corrected as shown below:

On the Title Page, Item (56), under “U.S. Patent Documents”, line 8, delete “370/86” and insert -- 370/84 --, therefor.

On the Title Page, Item (56), under “U.S. Patent Documents”, line 17, after “Dighe” insert -- et al. --.

On the Title Page, Item (56), under “Other Publications”, line 1, delete “et al,” and insert -- et al., --, therefor.

Page 2, Item (56), under “U.S. Patent Documents”, line 18, delete “395/200.61” and insert -- 395/200.77 --, therefor.

Page 2, Item (56), under “U.S. Patent Documents”, line 11, after “et al” insert -- . --.

Page 2, Item (56), under “Foreign Patent Documents”, line 6, delete “94/0194” and insert -- 94/01964 --, therefor.

Page 2, Item (56), under “Other Publications”, line 1, delete “et al,” and insert -- et al., --, therefor.

Page 2, Item (56), under “Other Publications”, line 8, delete “/barons.” and insert -- //barons. --, therefor.

Page 2, Item (56), under “Other Publications”, line 29, delete “RealNeworks,” and insert -- RealNetworks, --, therefor.

In column 15, line 23, in Claim 13, delete “streams” and insert -- stream --, therefor.

UNITED STATES PATENT AND TRADEMARK OFFICE

CERTIFICATE OF CORRECTION

PATENT NO. : 6,985,966 B1
APPLICATION NO. : 09/538611
DATED : January 10, 2006
INVENTOR(S) : Anoop Gupta et al.

It is certified that error appears in the above-identified patent and that said Letters Patent is hereby corrected as shown below:

In column 15, line 49, in Claim 17, delete "streams" and insert -- stream --, therefor.

Signed and Sealed this

Twenty-ninth Day of September, 2009

David J. Kappos
*Director of the United States Patent and Trademark Office*